July 21, 1959

A. C. MULLER 2,895,394

SINGLE LENS REFLEX CAMERA

Filed Feb. 29, 1956

INVENTOR
ALEX C. MULLER
BY
ATTORNEY

United States Patent Office 2,895,394
Patented July 21, 1959

2,895,394

SINGLE LENS REFLEX CAMERA

Alex C. Muller, New York, N.Y., assignor of fifty percent to Albert W. Moser, New York, N.Y.

Application February 29, 1956, Serial No. 568,472

6 Claims. (Cl. 95—42)

The present invention relates to improvements in photographic cameras, more particularly to single-lens reflex cameras of the type comprising a movable reflex mirror or reflector arranged in the path of the light rays passing through the light chamber of the camera from the lens to the sensitive medium (film, plate, etc.) in the focal plane or picture gate of the camera, said mirror serving to reflect an image of the subject or scene to be photographed onto the the ground glass or viewing screen mounted at the top of the camera light chamber. The mirror or reflector being arranged with one end hinged near the top of the light chamber forms an angle of 45° with the lens axis in the focusing or viewing position and is deflected into juxtaposition with the viewing screen immediately prior to the operation of the shutter of the camera, to enable the light rays from the scene or subject to reach the sensitive film or plate during the exposure interval.

In practice, it is customary to operatively combine the movement of the reflecting mirror with the operation of the shutter release or actuating means, such as a release lever or button, in such a manner that initial operation or movement of the shutter release means causes the mirror to move from the viewing position to the picture-taking position and out of the way of the direct light path between the lens and the film or plate, whereupon during continued operation of the shutter actuating means the shutter is operated or released, resulting in the exposure of the film or plate. Return of the reflector from the picture-taking position to the viewing or focusing position is ordinarily also effected automatically such as by the winding of the shutter and/or advance of the film from one to the next frame or picture.

This reflex finder unit, comprising the viewing screen, the reflex mirror and the camera lens, has the advantage of enabling the photographer to focus and correctly compose the image on the viewing screen and to ensure a photograph completely free from the parallax error or exactly as it appears in the finder, as a result of the same lens being used for the finder and for taking the picture. This freedom from parallax, that is the disparity between the finder image and the image upon the film or plate if a separate finder is used having an axis displaced relative to the lens axis, enables the use of exchangeable lenses for telephoto, wide angle, close-up and other effects, without the use of additional finder and/or focusing devices. Twin-lens reflex cameras and other cameras using a finder separate from or having an axis spaced relative to the lens axis do not have this advantage, which, among other advantages, accounts for the great popularity of the single lens reflex camera, especially for the smaller or miniature negative sizes or formats.

However, a drawback of the movable mirror or reflector of the conventional single lens reflex camera is the fact, especially when taking sports, candid or other action pictures, that there is an appreciable time interval from the instant of initially operating the shutter release means to the instant when the mirror has been completely moved out of the way of the direct light rays impinged upon the film or plate, that is, just prior to the release or operation of the shutter.

In the conventional type of reflex camera, the movement of the reflector from the focusing position to the picture-taking position is more or less under the control of the photographer throughout the operation of the shutter release means, that is, the movement of the reflector during its upward path is dependent upon the control or movement of the release lever or button during substantially its entire operating path or stroke, whereby to result in appreciable time delays from the instant of initiating the operation of the release means to the instant of reaching the final or picture-taking position by the reflector.

Aside from the fact that this may result in camera movement during the operation of the shutter, this delay is undesirable in that the expression of the subject or other variable characteristics of the picture may have changed when the reflector reaches its final or picture-taking position. Furthermore, the delay varies for different individuals, depending on temperament, position and steadiness of holding the camera etc.

Accordingly, an important object of the present invention is the provision of improved reflecting mirror operating means for single lens reflex cameras by which the above and related difficulties and drawbacks are substantially overcome.

A more specific object of the invention is the provision of operating mechanism for the reflecting mirror of a reflex camera by which the movement of the mirror from the viewing position to the picture-taking position, while synchronized with or initiated by the operation of the shutter release means of the camera, is substantially instantaneous and independent of the speed or operation of the shutter release means.

Another object is the provision of operating mechanism for the reflecting mirror of a reflex camera by which initial operation of the shutter release means effects an increase of the normal bias of the mirror towards its picture-taking position, in such a manner as to effect a substantially instantaneous or quick-action deflection of the mirror upon its release from the viewing position near the end of the operating path or stroke of the shutter release means or immediately prior to the actuation of the shutter of the camera.

Still another object is the provision of mechanism to instantly and automatically return the reflecting mirror of a reflex camera to viewing position after effecting an exposure or operation of the shutter of the camera.

The foregoing and ancillary objects, as well as novel aspects, of the invention will be better understood from the following detailed description taken in reference to the accompanying drawing, forming part of this specification and wherein.

Like reference numerals identify like parts in the different views of the drawing.

With the foregoing objects in view, the invention involves generally the provision of operating means for the reflecting mirror of a single lens reflex camera combined for uni-control with the shutter actuating or release means of the camera, said mirror being urged, by spring bias or the like, into picture-taking position in juxtaposition to the viewing screen or ground glass, but being normally retained or held in the viewing position at 45° angle to the lens axis by a detent mechanism in the form of a latch member having a pawl engaging a nose or projection of an actuating lever attached to said mirror. A control lever in operative engagement with the shutter release means of the camera serves to further bias or tension said actuating lever, in such a manner as to produce an intermittent additional biasing force for said reflector during the initial movement of the shutter release means or prior to the release of the reflector by said detent mechanism. As a result, upon release of the mirror by the detent mechanism at the end of the operating stroke or path of the shutter release means, the mirror in addition to its normal bias will be subject to an additional quick-acting biasing force, in such a manner as to result in a sudden and instantaneous deflection or movement to the picture-taking position, immediately prior to the operation of the shutter and substantially independent of the speed of operation or control of the shutter release means.

In this manner the operator is enabled to view the picture right up to the instant of exposure, and, in turn, to catch the expression or other changing characteristics of the subject or scene to be photographed. To all practical purposes this makes the single lens reflex camera the practical equivalent of cameras having a separate view finder.

According to an improved feature of the invention, the reflex mirror is automatically returned to the viewing position upon release of the shutter actuating means after completion of an exposure, thereby maintaining the mirror in constant readiness for viewing or judging of a scene or subject, without requiring winding of the shutter and/or advance of the film. In other words, according to this feature, the reflex mirror is at all times held in the viewing position and deflected or moved to picture-taking position only momentarily and during the brief periods of operation of the shutter of the camera. This is possible by the use of the additional spring controlled during the actuation of the shutter release means.

Figure 1:
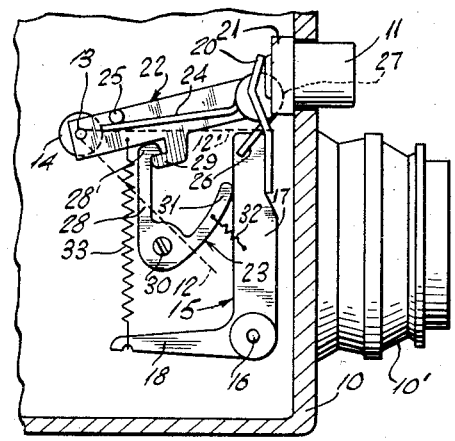
Fig. 1 is a partial cross-sectional view of a single lens reflex camera embodying automatic mirror operating mechanism constructed in accordance with the principles of the invention.

Referring to Fig. 1, numeral 10 indicates the camera casing enclosing a light chamber between the lens 10' projecting from the front wall of the casing and the image gate (not shown) in the focal plane containing the sensitive medium (film, plate) adjacent to the rear wall of the camera casing. Item 11 represents the shutter release means shown in the form of a button slideably mounted in the front wall of the casing 10, and 12 represents the reflex mirror in the light chamber shown in the viewing position and hinged at 13. The mirror 12 is normally urged towards the picture-taking position in juxtaposition to the ground glass or viewing screen 12' on the top of the camera light chamber, by means of a coil spring 14 or equivalent biasing means.

In the position shown in Fig. 1 the mirror is in its viewing or focusing position, forming an angle of 45° with the optical axis of the lens 10', to produce a real image of the scene or subject upon the viewing screen 12', in a manner well known and understood. The viewing screen, shutter and other accessories and details, such as the focusing hood, picture gate, film winding mechanism etc., are omitted from the drawing for simplicity of illustration and as being immaterial for the understanding of the invention.

The latter relates to the improved control of operating mechanism for the mirror 12 combined with the operation of the shutter release 11, this control mechanism being advantageously mounted upon the outside of the side wall of the light chamber 10 of the camera.

The improved mirror operating mechanism according to the invention comprises a bell-crank type first operating or control lever 15 having two arms 17 and 18 at right angle to one another and being pivoted at 16 upon the mounting wall or casing 10. Arm 17 of the lever 15 which may consist of a sheet metal stamping mounted flat against the casing has its end 20 bent first at right angle to the main part of the arm and at an angle with its own plane to provide a resilient end 20 engaging the inner end 21 of the release button 11. There are further provided a second or actuating lever 22 rigid with or attached to the mirror 12 or its pivot shaft and a detent or latch member 23 intermediate and cooperating with both the members 15 and 22, respectively.

Lever 22 serves both to hold or lock the mirror 12 in the viewing position as shown in the drawing by the latch member 23 and to tension or bias a further spring in the form of a flat spring or wire 24 during the initial movement of the release button 11, thereby to store or provide a quick acting biasing force in addition to the normal bias by the spring 14 of the mirror during each shutter operation and prior to effecting an exposure.

The spring 24 in Fig. 1 may be in the form of a flat spring or wire of springy material and, while the additional biasing force may be provided by simply deflecting the end of the spring by engagement with a pin 25 or the like upon the lever 22, as shown in the drawing, the spring may be internally biased or distorted by suitable treatment to result in a sudden or instantaneous deflection upon release of the arm 22 or to move from one position of equilibrium to another position of equilibrium by a snap action, in such a manner as to result in a practically instantaneously deflection or movement of the mirror 12 from the viewing position to the picture-taking position. In other words, the spring 24 may be in the form of a bi-stable snap-action element controlled by the button 11.

In the example shown, the spring 24 has one end engaging the pin 25 upon lever 22, its opposite end 26 being bent around a fixed screw head or pivot 27 and engaging a slot in the main operating lever arm 17. As a result, as the arm 17 is deflected inwardly in anti-clockwise direction by pressing the release button 11 towards the camera, the spring 24 is tensioned to additionally bias the mirror 12 in the manner pointed out.

Latch member 23 has two arms which are centrally pivoted at 30 upon the casing, the first arm 28 terminating in a pawl 28' which engages a nose or projection 29 of the mirror actuating lever 22 in the viewing position shown in the drawing and the second arm 31 forming a cam engaging the arm 17 of the main operating lever 15. There is further provided a tension spring 32 connecting the arm 31 with the arm 17 to maintain continuous engagement of said arms in all positions and a spring 33 connecting the end of lever arm 18 with a point of the actuating lever 22 near its pivot axis, to maintain the lever 15 in continuous engagement with the release button 11.

The mirror 12 may be held in the picture-taking position by suitable arresting means (not shown) and released automatically upon winding the shutter to return the mirror to viewing position by the combined action of the springs 14 and 33. Alternatively, the mirror may be returned automatically at the end of an exposure by a modified arrangement as shown in Figs. 2 and 3.

Figure 2:
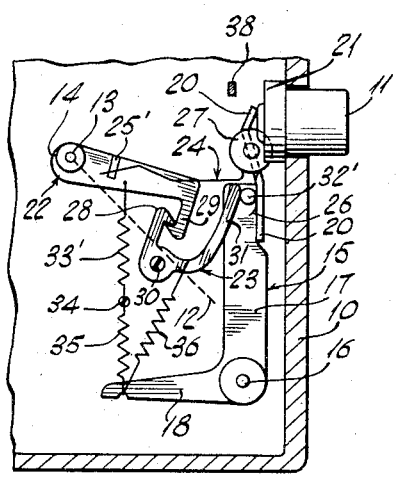
Fig. 2 shows a modification of the mirror operating mechanism of Fig. 1, the position shown corresponding to the viewing or focusing position of the reflecting mirror.
Figure 3:
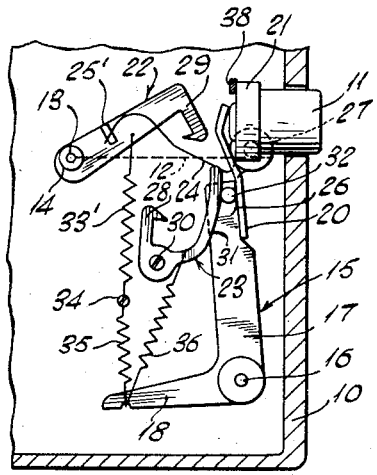
Fig. 3 shows the mechanism of Fig. 2 in the picture-taking position of the reflecting mirror at the end of the operating path of the shutter release means and immediately prior to the operation of the shutter.

Figs. 2 and 3 differ from Fig. 1 by the return spring 35 for the operating lever 15 being connected between the end of the lever arm 18 and a fixed point 34 upon the casing 10 and the provision of a separate return spring 33' for the lever 22 also connected between the fixed point 34 and an intermediate point of lever 22. Furthermore, there is provided a spring for the latch member 23 connected between the arm 31 of the latter and the end of the arm 18 of the main operating lever 15 and replacing spring 32 of Fig. 1. The arm 31 of the latch member is furthermore shown to cam with a pin 32' or the like upon the lever arm 17.

Furthermore, the biasing spring 24 is shown in the form of a snap action element to effect a quick or sudden deflection of the mirror 12 in the manner described and more clearly indicated in Fig. 3, which illustrates the position of the mechanism after release of the actuating lever 22 at the instant of operating the shutter by engagement of the iner end 21 of the release button 11 with a suitable shutter release element indicated at 38. For this purpose, the snap action spring 24 has one end secured to lever 22 as at 25', its opposite end 26 after bending around the pivot 27 being engaged by the extension 20 of lever arms 17 so as to be deflected inwardly upon operation of the shutter release button 11 and to stress or bias the spring 24 into a condition of deflection by a snap action upon release of lever 22 at the end of the operating stroke of the release.

In a construction of this type, if the button 11 is released after actuation of the shutter, the entire mechanism immediately returns to the viewing position of Fig. 2 by the combined action of the springs 14, 33' and 24 acting on the members 15, 22 and 23 in the manner described and readily understood. In other words, in this case, the spring 24 is a mono-stable snap-action element becoming flexed or deflected from the viewing position, Fig. 2, to the position of Fig. 3, to initiate the return of the mirror to said viewing position upon release of the button 11. As a result, the mirror 12 is automatically maintained at all times in the viewing or focusing position and moved to picture-taking position only momentarily each time and just prior to the instant of operating the shutter, the deflection of the mirror being practically instantaneous and independent of the control or operation of the shutter release member by the photographer. After release, the mechanism instantly returns to the viewing or focusing position, thus maintaining the camera in steady readiness at all times, independently of and without requiring winding of the shutter and/or advance of the film.

In the foregoing the invention has been described with reference to a specific illustrative device. It will be evident, however, that modifications and variations, as well as the substitution of equivalent means or elements for those shown, may be made without departing from the spirit and scope of the invention as defined in the appended claims. The specification and drawing are accordingly to be regarded in an illustrative rather than a limited sense.

I claim:

1. In a single lens reflex camera comprising a reflecting mirror movable, respectively between a viewing position intercepting the lens axis and a picture-taking position clear of said axis and shutter actuating means actuatable along a fixed operating path between an initial position and a shuter actuating position; operating mechanism for said mirror comprising first constant biasing means independent of said shutter actuating means to urge said mirror to said picture-taking position, detent means to normally hold said mirror in the viewing position against the action of said biasing means, means to release said detent means by said shutter release means at the end of said operating path and prior to the actuation of the shutter, and further biasing means for said mirror controlled by said shutter actuating means, to provide an additional biasing force intermittently raising said constant bias prior to the release of said mirror by said detent means, thereby to cause a quick-action deflection of said mirror from its viewing position to its picture-taking position.

2. In a single lens reflex camera comprising a reflecting mirror movable, respectively between a viewing position intercepting the lens axis and a picture-taking position clear of said axis and shutter actuating means actuatable along a fixed operating path between an initial position and a shutter actuating position; operating mechanism for said mirror comprising first constant spring biasing means independent of said shutter actuating means to urge said mirror to said picture-taking position, detent means to normally hold said mirror in the viewing position against the action of said biasing means, means to release said detent means by said shutter release means at the end of said operating path and prior to the actuation of the shutter, and further snap-action biasing spring means for said mirror controlled by said shutter actuating means, to provide an additional biasing force intermittently raising said constant bias prior to the release of said mirror by said detent means, thereby to cause a quick-action deflection of said mirror from the viewing to the picture-taking position.

3. In a single lens reflex camera comprising a reflecting mirror movable between a viewing position intercepting the lens axis and a picture-taking position clear of said axis and shutter actuating means actuatable along a fixed operating path between an initial position and a shutter actuating position; operating mechanism for said mirror comprising first constant biasing means independent of said shutter actuating means to urge said mirror to said picture-taking position, a pivoted operating lever in resilient engagement with said shutter release means, locking means having detent means to normally hold said mirror in the viewing position against the action of said biasing means and camming means engaging said operating lever, to release said detent means at the end of said operating path and prior to the release of the shutter by said shutter actuating means, and further biasing means for said mirror effectively controlled by said operating lever, to provide an additional biasing force intermittently raising the constant bias prior to the release of said mirror by said detent means, thereby to cause a quick-action deflection of said mirror from its viewing position to its picture-taking position.

4. In a single lens reflex camera comprising a reflecting mirror having a pivoted shaft for movement between a viewing position intercepting the lens axis and a picture-taking position clear of said axis and shutter actuating means actuatable along a fixed operating path between an initial position and a shutter actuating position; operating mechanism for said mirror comprising first constant spring biasing means independent of said shutter actuating means to urge said mirror to said picture-taking position, an actuating lever connected to said mirror, a pivoted operating lever in resilient engagement with said shutter actuating means, pivot latch means comprising detent means having a pawl engaging a projection of said actuating lever, to normally hold said mirror in its viewing position against the action of said biasing means, and camming means of said latch means engaged by said operating lever, to release said detent means at the end of said operating path and prior to the release of the shutter by said actuating means, and further spring biasing means for said mirror connected between said actuating and operating levers, to provide an additional biasing force intermittently raising the constant bias prior to the release of said mirror by said detent means, thereby to cause a quick-action deflection of said mirror from its viewing position to its picture-taking position.

5. In a reflecting mirror operating mechanism as claimed in claim 1, wherein said further biasing means is stressed during the operation of said mirror from its viewing position to its picture taking position, to cause a return of said mirror to the viewing position upon release of said shutter actuating means subsequent to the operation of the shutter.

6. In a reflecting mirror operating mechanism as claimed in claim 2, wherein said snap-action spring is deflected and stressed during the operation of said mirror from its viewing position to its picture-taking position, to cause a return of said mirror to the viewing position upon release of said shutter actuating means subsequent to the operation of the shutter.

References Cited in the file of this patent

UNITED STATES PATENTS

| 438,944 | Perry | Oct. 21, 1890 |
| 1,166,914 | Krost | Jan. 4, 1916 |
| 2,576,494 | Waggin | Nov. 27, 1951 |
| 2,579,247 | Angenieux | Dec. 18, 1951 |

FOREIGN PATENTS

| 287,031 | Germany | Sept. 9, 1915 |
| 454,449 | Germany | Jan. 9, 1928 |
| 454,450 | Germany | Jan. 9, 1928 |
| 726,693 | Germany | Oct. 19, 1942 |